United States Patent [19]

Baum

[11] Patent Number: 5,187,791
[45] Date of Patent: * Feb. 16, 1993

[54] MICROPROCESSOR WITH IMPROVED INTERRUPT RESPONSE WITH DATA SAVING DEPENDENT UPON PROCESSOR STATUS USING STATUS FLAG

[75] Inventor: Allen J. Baum, Palo Alto, Calif.

[73] Assignee: Apple Computer, Inc., Cupertino, Calif.

[ * ] Notice: The portion of the term of this patent subsequent to Mar. 10, 2009 has been disclaimed.

[21] Appl. No.: 784,264

[22] Filed: Oct. 29, 1991

Related U.S. Application Data

[63] Continuation of Ser. No. 471,091, Jan. 26, 1990, Pat. No. 5,095,526.

[51] Int. Cl.⁵ .............................................. G06F 13/24
[52] U.S. Cl. ...................... 395/725; 364/DIG. 1; 364/280.8; 364/242.2; 395/775
[58] Field of Search ................................. 395/725, 775

[56] References Cited

U.S. PATENT DOCUMENTS 4,268,904  5/1981  Suzuki et al. ..................... 395/275
4,470,893  4/1988  Buchholz et al. .................. 395/375
4,809,157  2/1989  Eilert et al. ...................... 395/650
4,812,967  3/1989  Hirosawa et al. .................. 395/725
5,041,964  8/1991  Cole et al. ........................ 395/425

Primary Examiner—Lawrence E. Anderson
Attorney, Agent, or Firm—Blakely, Sokoloff, Taylor & Zafman

[57] ABSTRACT

A method for reducing interrupt processing overhead is applied in situations when it is not necessary to preserve processor state information. A flag is provided to indicate whether or not the processor is available. Upon recognition of an interrupt, an interrupt vector address is computed based, in part, on the state of the processor available flag. If the processor is available, indicating that it is not currently working on a task, there is no need to preserve the processor state information, and the state-saving portions of the interrupt processing routines are bypassed. On the other hand, if the processor is not available, indicating that the it is engaged in a task, the state information must be preserved so that the processor can return to the task after the interrupt is processed. In this case, the state-saving portions of the interrupt processing routines are not bypassed.

6 Claims, 1 Drawing Sheet

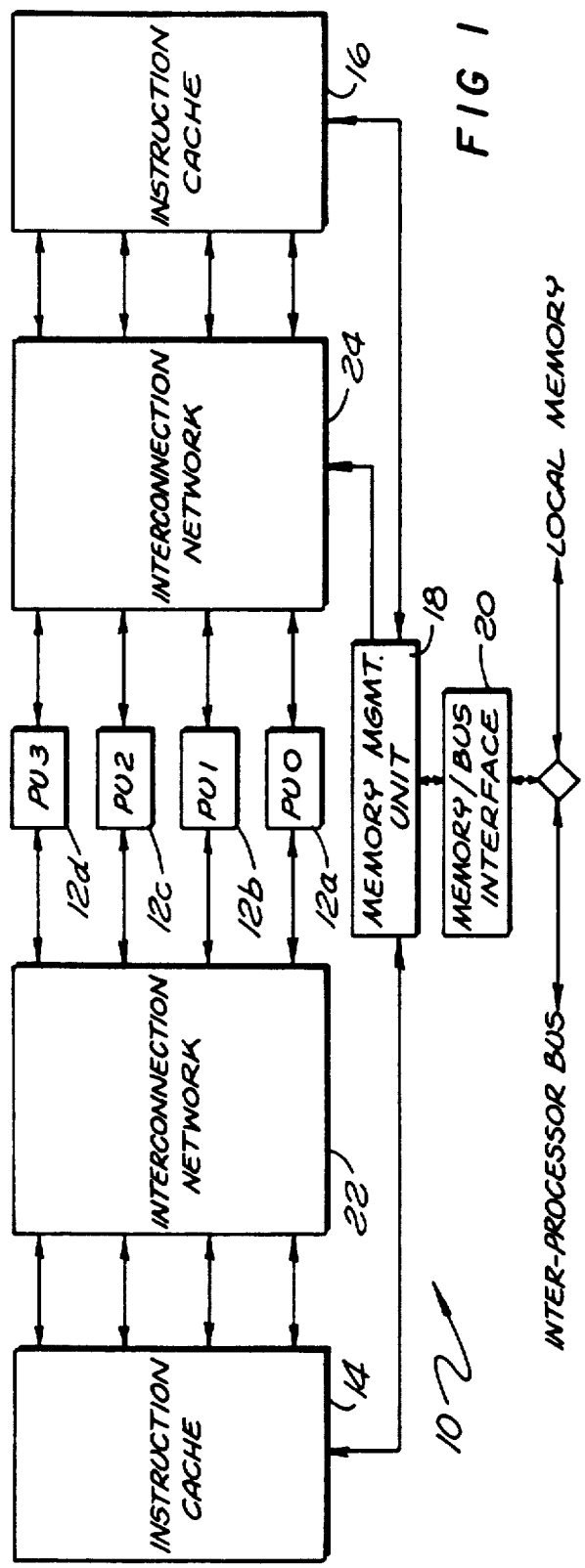

MICROPROCESSOR WITH IMPROVED INTERRUPT RESPONSE WITH DATA SAVING DEPENDENT UPON PROCESSOR STATUS USING STATUS FLAG

This is a continuation of application Ser. No. 07/471,091, filed Jan. 26, 1990, now U.S. Pat. No. 5,095,526.

BACKGROUND OF THE INVENTION

FIELD OF THE INVENTION

This invention relates to the field of data processing devices, and more particularly, to an interrupt handling routine for a microprocessor.

BACKGROUND ART

Data processing systems in general, and microprocessors in particular, are commonly provided with one or more ports for sensing an interrupt. Interrupts may be provided upon the occurrence of various internal or external events, such as an error or fault condition. Executive level software is generally provided to process or handle interrupts when they occur. Since interrupts, by their nature, are asynchronous with the normal operations of the processor, the processor's state with respect to a current task at the time of an interrupt is indeterminate. Thus, it is common practice to save information regarding the state of the processor as part of the interrupt handling routine. Such state information may include program pointers, general and special register contents and the like. If such state information is not saved, the processor is unable to resume a task upon returning from an interrupt and must be re-initialized.

State saving during interrupt processing necessarily increases the operational overhead of the processor. Frequently, such state saving is unnecessary since the processor may be idle at the time of an interrupt or, due to the nature of the interrupt, may not return to the task it was performing at the time the interrupt occurred. Thus, a reduction in processor overhead can be achieved if state saving is performed selectively as a function of the processor status and/or nature of the interrupt.

Some prior art microprocessors provide flag bits to indicate whether or not certain internal registers have been used since the corresponding flag was reset. If the register or register file associated with a flag has not been used, then the contents of such register(s) need not be saved during interrupt processing. For example, the "CLIPPER" module manufactured by Fairchild Semiconductor includes a bit in a system status word to indicate when a floating point register is "dirty", i.e. has been written. Thus, it is possible to avoid saving the contents of the floating point registers during interrupt processing if they have not been used.

It is also known in the art of multiprocessor systems to provide a flag to indicate when a processor is available or "useable". For example, the R2000 from MIPS Computer Systems, Inc. provides a set of flag bits in a system status register to indicate and control the usability of the four coprocessors in the system.

However, microprocessor systems have not heretofore utilized processor status information to adaptively control interrupt processing so as to reduce operating overhead in the manner described below.

SUMMARY OF THE INVENTION

The present invention provides a method for reducing interrupt processing overhead in situations when it is not necessary to preserve processor state information. A Processing Unit (PU) Available flag is provided in a Processor Status Register. Upon recognition of an interrupt (or trap), an interrupt vector address is computed based, in part, on the state of the PU Available flag. If the PU is "available", indicating that it is not currently working on a task, there is no need to preserve the PU state information, and the state-saving portions of the interrupt processing routines are bypassed. On the other hand, if the PU is "not available", indicating that the PU is engaged in a task, the PU state information must be preserved so that the PU can return to the task after the interrupt is processed. In this case, the state-saving portions of the interrupt processing routines are not bypassed.

The present invention is also advantageously applied in a multiprocessor environment to select an "available" PU to process an interrupt, thereby achieving a reduction in interrupt processing overhead.

BRIEF DESCRIPTION OF THE DRAWINGS

FIG. 1 is a functional block diagram of a central processing unit (CPU) suitable for implementing the present invention.

FIG. 2 illustrates the bit and byte structure of data words in the CPU of FIG. 1.

NOTATION AND NOMENCLATURE

The detailed description which follows is presented largely in terms of algorithms and symbolic representations of operations on data bits within a computational device. These algorithmic descriptions and representations are the means used by those skilled in the data processing arts to most effectively convey the substance of thier work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities. Further, the manipulations performed are also referred to in terms, such as adding or comparing, which are commonly associated with mental operations performed by a human operator. No such capability of a human operator is necessary, or desirable in most cases, in any of the operations described herein which form part of the present invention; the operations are machine operations. While the present invention is most advantageously applied in a microprocessor, other useful machines for performing the operations of the present invention may include general purpose digital computers and similar devices. In all cases, the distinction between the method operations and operating a computer and the method of computation itself should be noted. The present invention relates, in part, to method steps for operating the processor and thereby process electrical signals to generate other desired electrical signals.

DETAILED DESCRIPTION OF THE INVENTION

In the following description, for purposes of explanation and not limitation, specific data representations, bit assignments, sequences of operation, etc. are set forth in order to provide a thorough understanding of the present invention. However, it will be apparent to one skilled in the art that the present invention may be practiced in other embodiments that depart from these specific details. In other instances, detailed descriptions of well known data processing devices, techniques and algorithms are omitted so as not to obscure the description of the present invention with unnecessary detail.

CPU Overview

In order to provide a thorough understanding of the present invention, an overview of a CPU in which the invention is preferably embodied will first be presented. Referring to FIG. 1, a CPU indicated generally as 10 comprises four independent processing units (PUs) 12a–d which share access to an instruction cache 14, a data cache 16, a Memory Management Unit (MMU) 18, and a Memory/Bus Interface 20. In addition to communicating through memory, PUs 12a–d can communicate and can coordinate their activities via broadcast instructions, which permit one PU to send data and addresses simultaneously to other PUs and to suspend its execution until other PUs complete execution of their activities. Multiple CPUs can be connected via an Interprocessor Bus (IPB) to form a multiprocessor system in which each CPU has its own local memory which it can share with other CPUs. Support for inter-CPU messaging is provided by interrupt-on-write pages as will be described below.

Each of the four identical and independent PUs 12a–d of CPU 10 is a 32-bit RISC (Reduced Instruction Set Computer). The four PUs access the instruction and data caches via interconnection networks 22 and 24. In addition to providing PU cache data transfer paths, these networks provide a direct inter-PU communication path for broadcast operations and global register access, as well as a path for interrupt routing. Instruction and data caches are divided into four banks, and each interconnection network includes a 5×4 crossbar switch, permitting simultaneous instruction and data accesses by all four PUs.

In one embodiment of CPU 10, a flat (unsegmented) virtual address space of 4096 megabytes (MB) is provided. A 4-megabyte area at the high end of each address space is reserved for the system kernel; the remaining 4092 megabytes, called user space, are available for the user and for other parts of the operating system. The kernel region is not paged, but instead maps directly to the first 4 megabytes of real memory. A single instance of the kernel, then, is common to all address spaces. User space is pageable. The standard page size is 8192 bytes (8 KB), but it is possible to define special frame buffer regions in which space is allocated in super-page units, which can range from 256 KB to 8 MB.

An address space is defined by a set of virtual-to-real page mappings which are recorded in a translation table. Each address space has its own translation table. At any instant, only one address space can be active on a CPU; the four PUs always execute in the same address space. A global register holds a pointer to the start of the translation table for the currently active address space. Translation tables have a simple, two-level structure, composed of a first-level directory and one or more second-level page tables. In addition to virtual-real mappings, translation table entries identify pages as system, read-only, non-cacheable, or interrupt-on-write.

Translation of virtual addresses to real addresses is done by the Memory Management Unit (MMU) using mappings obtained from translation table entries. To avoid reading directory and page table entries on every translation, the MMU maintains the most recently used mappings in a translation buffer. Virtually-addressed caches are preferred so that address translation is required only on a cache miss or on an access to a non-cached page. A 32-bit virtual address translates into a 36-bit real address, comprising a 4-bit node number and a 32-bit intra-node address. A node number identifies a position on the Inter-Processor Bus (IPB); the node at which a particular real page resides is said to be the owner of that page. On a cache miss or a non-cached memory access, the MMU sends a memory access request to the Memory/Bus Interface (MBI), which examines the node number of the real address accompanying the request. If the node number is the same as that of the CPU generating the request, then the request is directed to the local memory; otherwise, the request is sent to the specified node, or remote memory, via the IPB.

Pages (other than super-pages) can be marked "interrupt-on-write". As more fully described below, a store to an interrupt-on-write page causes a message interrupt to be presented to the node owning that page when the store is performed. The interrupt-on-write page can reside in either local or remote memory, and must also be non-cacheable. Interrupt-on-write pages provide a mechanism for transmitting messages between nodes and for coordinating activities of different nodes.

When CPU 10 receives a message interrupt or an external interrupt (such as an I/O interrupt), it examines the status of its four PUs. If one of the PUs is halted, it is assigned to process the interrupt. Only if all four PUs are busy is it necessary to actually interrupt PU execution. Interrupt processing, then, frequently can be done in parallel with application execution. Each PU has a flag which indicates if its state must be saved on interrupt. If a PU sets this flag prior to halting, state saving overhead on interrupt processing can be eliminated.

The PUs have a small register-oriented instruction set in which all data access to memory is done by register load and store instructions. Register and word size is 32 bits. Each PU 12a–d has 16 general-purpose registers, a total of 64 for CPU 10, and 7 local registers. Local registers include product, remainder, prefix, and various state saving registers. In addition, the four PUs share 8 global registers, including interrupt, event counter, and global status registers.

All instructions are 16 bits in length. There are two address modes: register, and base plus displacement. Base plus displacement addressing provides a displacement of up to 64 words from the base register address. However, prefixing can be used to increase the displacement range, transform register addressing into base plus displacement addressing (with any register as base), and provide signed displacements.

The 16-bit instruction length limits the size of immediate and displacement fields in the instructions. However, a large proportion of immediate and displacement values encountered in programs are small enough to be contained in these fields. When necessary, larger values can be created by prefixing the immediate or displacement field value. Each PU has a local register called the Prefix Register, whose state (empty or not empty) is represented by a Prefix Valid flag. Values are loaded into the Prefix Register by a Prefix instruction. If the Prefix Register is empty when a Prefix instruction is executed, the immediate field of the Prefix instruction is stored in the low-order bits of the Prefix Register and sign extended, and the Prefix Valid flag is set to not empty. If a second Prefix instruction is then executed, the contents of the Prefix Register are shifted left and the immediate field of the second Prefix instruction is stored in the low-order bits of the Prefix Register. When an instruction with a prefixable immediate or displacement is executed, the Prefix Valid flag is examined. If the Prefix Register is not empty, the contents of the Prefix Register are concatenated with the instruction's immediate or displacement field to form the effective immediate or displacement value. Prefixing also is used to define fields for field manipulation instructions.

The elements and organization of CPU 10 can be better understood in terms of a programming model comprising the elements of the CPU which are visible to a programmer (i.e., can be operated on by instructions). These elements include general registers, status register and program counter, special registers, and the instruction and data caches.

Various instructions operate on 32-bit full words, 16-bit half words, 8-bit bytes, and individual bits. Instructions themselves always are a half word in length. Only words and bytes can be directly loaded into a register from memory or stored to memory from a register. Arithmetic operations can be performed on words, half words, and bytes. As illustrated in FIG. 2, the 32 bits of a word are numbered right to left, from 0 to 31. Bit 0, the rightmost bit, is the least significant bit. Higher-numbered bits often are referred to as the high-order bits, and lower-numbered bits often are referred to as the low-order bits.

Half words and bytes within a word are positioned as shown in FIG. 2, which also shows bit ordering within half words and bytes. Byte 0 is the most significant (leftmost) byte, while byte 3 is the least significant (rightmost) byte.

In general, instructions and data are transferred between memory and CPU 10 in 64-byte (16-word) blocks called lines, which are stored in the instruction cache or data cache. The term "line" or "cache line" is used to refer to both a physical location in a cache and a block of 16 memory words which can be stored in that location. Instruction and data caches are architecturally visible, and instructions are provided to perform operations on cache lines including prefetch, invalidate, and flush.

Instruction and data addresses are byte addresses, 32 bits in length, spanning a virtual address space of 4096 megabytes. While all addresses are byte addresses, memory accesses for instructions and data are constrained to the appropriate boundaries. A half word boundary is a byte address with bit $<0> = $ "0", a word boundary is a byte address with bits $<1:0> = $ "00", and a line boundary is a byte address with bits $<5:0> = $ "000000". Instructions always must be aligned on a half word boundary; the low-order bit of an instruction address is ignored. Word operands always must be aligned on word boundaries; the low-order two bits of the operand address of a load or store word instruction are ignored. Cache lines, by definition, are aligned on cache line boundaries. Line transfers between the CPU and memory always are done on line boundaries. The low-order six bits of the operand address of a cache control instruction are ignored.

The programming model comprises a general register set, status register and program counters, a special register set, and the instruction and data caches. Each PU has its own general register set, status register, and program counters; these registers are said to be local to the PU. Each PU also has its own copy of certain special registers, while other special registers are common to all PUs; these are called global registers.

PUs execute in one of two modes; user mode or system mode. The current operating mode of a PU is determined by the setting of a flag in the PU Status/Control Register. Generally, applications execute in user mode, while the operating system kernel and other parts of the operating system execute in system mode. Execution in system mode confers certain privileges. Some special registers can be accessed only in system mode, certain instructions can be executed only in system mode, and pages marked "system only" can be accessed only in system mode.

Each PU has 16 32-bit general registers, numbered 0-15, so that there are 64 general registers for the CPU as a whole. General registers are generally interchangeable; any register can be used for any purpose. Any individual general register can be loaded from memory or have its contents stored to memory. From 1 to 15 registers can be loaded from memory or have their contents stored to memory via Load/Store Multiple instructions. A Load Byte instruction loads the addressed byte, right-justified with zero fill, into a general register. A Store Byte instruction stores the rightmost byte of a general register to memory.

There are two program counters (PCs), called the Current PC and the Next PC. Current PC holds the address of the currently-executing instruction. Next PC holds the address of the next instruction to be executed. Two program counters are required because of delayed branching. On a taken branch or jump, Current PC holds the address of the branch shadow instruction, and the branch target address is stored in Next PC. For sequential code, the address in Next PC usually is equal to the address in Current PC plus 2. Instructions must start on half word boundaries, so program counter bit $<0>$ always is "0".

The contents of Current PC can be read by executing a Load Program Counter instruction, which loads the address in the Current PC, plus 2, into a general register. In addition to the normal incrementing which takes place in execution of sequential code, program counters are modified when a taken branch or jump instruction is executed, or when a return from interrupt takes place. When an interrupt or a trap is recognized by an interrupt/trap enabled PU, the contents of the Current and Next PCs are saved in a special register pair called the PC Save Queue; on return from interrupt, the contents of the PC Save Queue are transferred to Current PC and Next PC.

Interrupt/Trap Processing

The distinction between interrupts and traps is commonly based on their source. From the viewpoint of the executing program, an interrupt is an external event unrelated to program execution, while a trap is an internal event, caused by execution of a particular instruction in the program. In the following description, the distinction will be based on destination; traps always are processed by a specific PU, while interrupts can be processed by any available PU. However, in some instances the term "interrupt" will be used in a generic sense to include traps as well.

Interrupts and traps result in transfers to different kernel entry addresses. Also, the entry address for an interrupt or a trap depends on the interrupt/trap type and on the setting of a PU Available flag in the PU Status and Control Register (PsR).

From a hardware view, interrupt and trap handling divides into three phases; generation, presentation, and recognition. An interrupt or trap is generated when a particular event, such as a machine error, occurs; it is then presented to the CPU for assignment of a PU to process it. Traps always are presented to the PU on which they were generated. An interrupt or trap is recognized when a PU is selected to process it and a transfer of control to the interrupt handler of that PU is initiated. A PU can disable recognition of interrupts and traps, in which case an interrupt (although not a trap) may be assigned to another PU. Interrupts and traps whose presentation or recognition can be disabled are called maskable. Interrupts and traps resulting from errors cannot be disabled and hence are referred to as non-maskable.

Interrupts can be processed by any PU. In recognizing an interrupt, the CPU assigns a maskable interrupt to a halted PU, if there is at least one halted PU, and otherwise to a PU for which interrupt/trap recognition and the pending interrupt can be processed. Non-maskable (error) interrupts always are presented to and are immediately recognized by PU 0. A trap always is presented to the PU on which it was generated, in the case of local exceptions, or to which it was directed, in the case of inter-PU signals.

Certain of the PU's special registers are dedicated to preserving PU state information when an interrupt or trap is recognized. The Status Save Register (SaveR) is a local, privileged register. When an interrupt or a trap is recognized, the contents of the PsR are moved to the SaveR, from where they can later be examined and restored to the PsR. The fields of the SaveR correspond to those of the PsR. Following interrupt or trap recognition, the contents of the SaveR remain valid only up to the time at which the PU reenables interrupt/trap recognition.

The PC Save Queue register (PCQ) is a FIFO register pair comprising two 32-bit registers PCQ1 and PCQ2. When an interrupt or a trap is recognized, the instruction address in Current PC is transferred to PCQ1 and the instruction address in Next PC is transferred to PCQ2. following interrupt/trap recognition, the contents of the PCQ remain valid only up to the time at which the PU reenables interrupt/trap recognition.

Upon completion of interrupt processing, return to the application program is effected by Return from Interrupt (RtI) instructions which are executed in pairs. The RtI instructions cause the contents of the PC Save Queue to be sequentially shifted, fist into Next PC and then into Current PC such that both PC registers are restored to their pre-interrupt states after the second RtI instruction. The second RtI instruction also completes restoring the PsR from the SaveR. If the Halt flag in the restored PsR (bit 24) is "1", PU execution halts following execution of the second RtI instruction; otherwise, execution continues with the instruction whose address is in Current PC.

If a PU recognizes an interrupt or a trap while executing an application program, it is necessary to save the PU state information so that processing may resume after the interrupt or trap is processed. Other than saving the PsR and PC registers as described above, the kernel may save various other registers and flags.

On recognition of any particular interrupt or trap, control is transferred to one of two kernel entry addresses, depending on the setting of the PU Available (PUA) Flag in the PsR. This flag is set only by software (using a Set Mode instruction). It is cleared when the PU is a target of a Start instruction issued by another PU, when an interrupt or a trap is recognized, or on return from interrupt if bit 0 of SaveR is "0".

The intended interpretation of the PUA flag is that, when set, the kernel is not required to save PU state on interrupt/trap recognition or restore state prior to returning from processing the interrupt, thereby reducing interrupt processing overhead. For example, when switching address spaces, local register saving and restoring, except for the SaveR and PCQ registers as described above, is assumed to be unnecessary if PUA is set. To effect this, PU activities should, on completion of execution, set PUA prior to halting. From a hardware standpoint, the PUA flag is used in the kernel entry address selection and may also be used in selecting a PU to process an external or event counter overflow interrupt.

In a preferred embodiment of the processor, interrupt/trap recognition causes control to be transferred (by setting an address in Current PC) to one of eight interrupt/trap entry addresses generated as follows. Recognition of an interrupt causes a PU to transfer control to the kernel at a hexadecimal address determined by the following formula:

$$FFC00000 + 200 \times NE + 100 \times PUA$$

where NE is "0" if the interrupt does not represent an error and is "1" otherwise, and PUA is the PU Available flag in bit 0 of the PU's PsR.

Recognition of a trap causes a PU to transfer control to the kernel at a hexadecimal address determined by the following formula:

$$FFC00400 + 200 \times NE + 100 \times PUA$$

where NE is "0" if the trap represents an error and is "1" otherwise, and PUA is the PU Available flag from the PsR.

Separate entry addresses are provided for error and non-error interrupts and traps so that the kernel can, in the error case, bypass critical sections used in non-error trap/interrupt processing. The spacing between successive entry addresses is 256 bytes (128 instructions).

From the above formulas, it can be seen that the various possible entry addresses are as follows:

| Interrupt/Trap type | PU availability | Entry address |
| --- | --- | --- |
| Error interrupt | Not available | FFC00000 |
|  | Available | FFC00100 |
| Non-error interrupt | Not available | FFC00200 |
|  | Available | FFC00300 |
| Error trap | Not available | FFC00400 |

| Interrupt/Trap type | PU availability | Entry address |
|---|---|---|
| | Available | FFC00500 |
| Non-error trap | Not available | FFC00600 |
| | Available | FFC00700 |

Note that interrupt and trap entry addresses can be formed by setting instruction address bits 22 through 31 to "1" to designate a kernel address, setting bit 8 to PUA, setting bit 9 if the interrupt or trap does not represent an error, setting bit 10 for a trap, and clearing the remaining bits.

Apart from its value in determining the interrupt vector address as described above, the PUA flag is also advantageously employed by certain user mode instructions. For example, a Start instruction is provided to cause a target PU to begin execution at a specified address. Execution of a Start instruction causes the PUA flag of the target PU to be cleared since it is no longer available for assignment to another task. Set, Clear and Test Mode instructions are provided to permit a PU to set, clear and/or test the various flags in its PsR, including the PUA flag.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. In a data processing device including a programmable processor and an interrupt program executed by said programmable processor, a method for controlling the operation of said interrupt processing program comprising the steps of:
    a) providing a register for storing a processor status flag;
    b) setting said processor status flag with an instruction executed in said programmable processor to a first logical state when the processor is entering an idle state and setting said processor status flag to a second logical state when the processor is not idle;
    c) testing said processor status flag upon recognition of an interrupt;
    d) entering said interrupt processing program at an interrupt vector address computed as a first address if said processor status flag is in the first logical state and entering said interrupt processing program at an interrupt vector address computed as a second address if said processor status flag is in the second logical state, said interrupt processing program including a state saving routine executed only if said interrupt processing program is entered at said second address so as to save processor state information if and only if the processor status flag is in said second logical state immediately prior to execution of said interrupt processing program.

2. The method of claim 1 wherein said data processing device includes a plurality of programmable processors each having a corresponding processor status flag and wherein execution of said interrupt processing program comprises selection of one of said plurality of processors to execute said interrupt processing program, said selected processor being one with its respective processor status flag set to the first logical state if any of said plurality of processors are idle.

3. The method of claim 1 wherein said processor is included in a multiprocessor system and said processor status flag is set to said second logical state by an instruction having an operand designating said processor.

4. The method of claim 1 wherein said interrupt vector address is set to an address computed as a base address plus the product of an offset address multiplied by the logical value of said processor status flag.

5. The method of claim 4 wherein a received interrupt is classified as belonging to one of a plurality of interrupt classes and wherein said computed interrupt vector address is further modified according to the classification of said received interrupt.

6. The method of claim 3 wherein said interrupt vector address is set to an address computed as said base address plus the product of a first offset address multiplied by the logical value of said processor status flag plus the product of a second offset address multiplied by a classification value of said received interrupt.

* * * * *